United States Patent
Roberts, Jr.

(10) Patent No.: US 6,708,666 B2
(45) Date of Patent: Mar. 23, 2004

(54) MULTI-ZONE COMBUSTION CHAMBER FOR COMBUSTION RATE SHAPING AND EMISSIONS CONTROL IN PREMIXED-CHARGE COMBUSTION ENGINES

(75) Inventor: Charles Edward Roberts, Jr., San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 28 days.

(21) Appl. No.: 09/974,210

(22) Filed: Oct. 10, 2001

(65) Prior Publication Data

US 2003/0066507 A1 Apr. 10, 2003

(51) Int. Cl.$^7$ .......................... F02B 19/12; F02B 19/16; F02B 23/08
(52) U.S. Cl. ............... 123/256; 123/193.5; 123/193.6; 123/279; 123/281; 123/663; 123/664; 123/671
(58) Field of Search .................. 123/193.5, 193.6, 123/256, 276, 279, 281, 282, 283, 285, 289, 657, 661, 662, 663, 664, 667, 671, 659, 193.4

(56) References Cited

U.S. PATENT DOCUMENTS

| | | | | |
|---|---|---|---|---|
| 1,605,381 A | | 11/1926 | Wirrer | 123/268 |
| 1,668,471 A | * | 5/1928 | Summers | 123/657 |
| 2,815,014 A | * | 12/1957 | Adams | 123/193.6 X |
| 2,881,743 A | * | 4/1959 | Holt | 123/276 |
| 3,079,901 A | * | 3/1963 | Hallberg | 123/289 X |
| 3,283,751 A | | 11/1966 | Goosak et al. | 123/275 |
| 3,504,681 A | | 4/1970 | Winkler | 123/260 |
| 3,797,466 A | | 3/1974 | Nambu | 123/256 |
| 3,923,015 A | | 12/1975 | Mukai et al. | 123/259 |
| 3,976,038 A | * | 8/1976 | Stahl | 123/257 |
| 4,009,702 A | | 3/1977 | Mayer | 123/193.6 |
| 4,453,513 A | | 6/1984 | Perrin et al. | 123/279 |
| 4,465,033 A | * | 8/1984 | Blaser | 123/193.6 X |
| 4,543,929 A | | 10/1985 | Kataoka et al. | 123/263 |
| 4,557,231 A | * | 12/1985 | Thery | 123/279 |
| 4,788,942 A | * | 12/1988 | Pouring et al. | 123/289 X |
| 4,920,937 A | | 5/1990 | Sasaki et al. | 123/305 |
| 5,060,609 A | | 10/1991 | Merritt | 123/256 |
| 5,065,715 A | | 11/1991 | Evans | 123/263 |
| 5,076,229 A | | 12/1991 | Stanley | 123/289 |
| 5,103,784 A | | 4/1992 | Evans | 123/279 |
| 5,115,774 A | | 5/1992 | Nomura et al. | 123/276 |
| 5,224,449 A | | 7/1993 | Fukano et al. | 123/267 |
| 5,617,823 A | * | 4/1997 | Gray, Jr. et al. | 123/254 |

FOREIGN PATENT DOCUMENTS

| | | | | |
|---|---|---|---|---|
| DE | 3720865 | * | 1/1989 | 123/279 |
| FR | 1003679 | * | 3/1952 | 123/662 |
| JP | 2-130217 | * | 5/1990 | 123/276 |
| JP | 4-287871 | * | 10/1992 | 123/638 |
| JP | 5-86992 | * | 4/1993 | 123/FOR 124 |
| JP | 6-10674 | * | 1/1994 | 123/193.6 |
| JP | 8-49546 | * | 2/1996 | |
| SU | 956828 | * | 9/1982 | 123/657 |

\* cited by examiner

*Primary Examiner*—Tony M. Argenbright
(74) *Attorney, Agent, or Firm*—Baker & Hostetler LLP

(57) ABSTRACT

An apparatus and method for improving efficiency of combustion engines. At least two combustion chambers are provided by contouring the surface of a piston or a cylinder head or a combination thereof. Such a contoured piston or cylinder head controls the peak temperature and pressure in order to combust the mixture efficiently, to increase power generated, and to decrease the amount of unused mixture exhausted from the combustion chamber. With the ability to control the peak pressure, the ignition plug can be fired at advanced ignition timing, thereby extending its life. The chambers are also designed to control flame propagation speed to reduce knock. Additionally, the chambers can also decrease the amount of pollutants such as $NO_x$ produced during combustion.

44 Claims, 5 Drawing Sheets

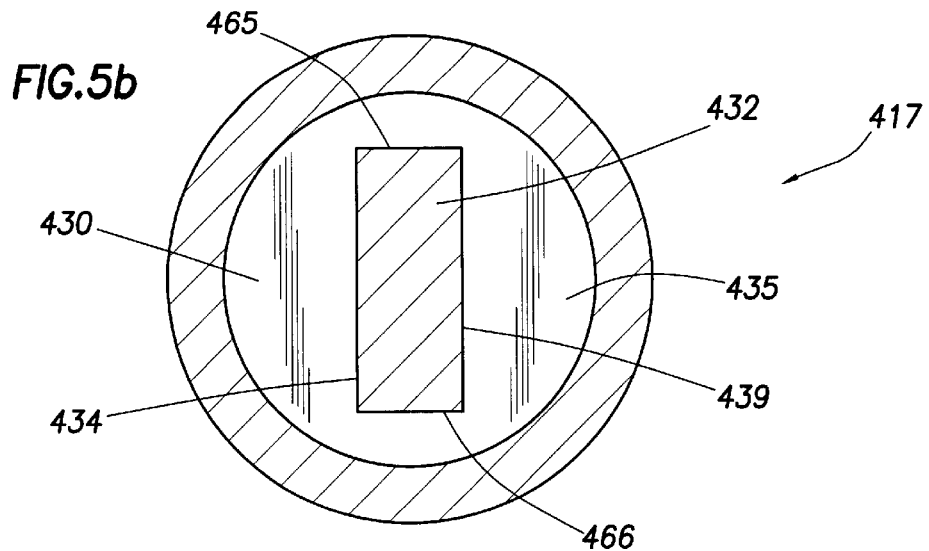
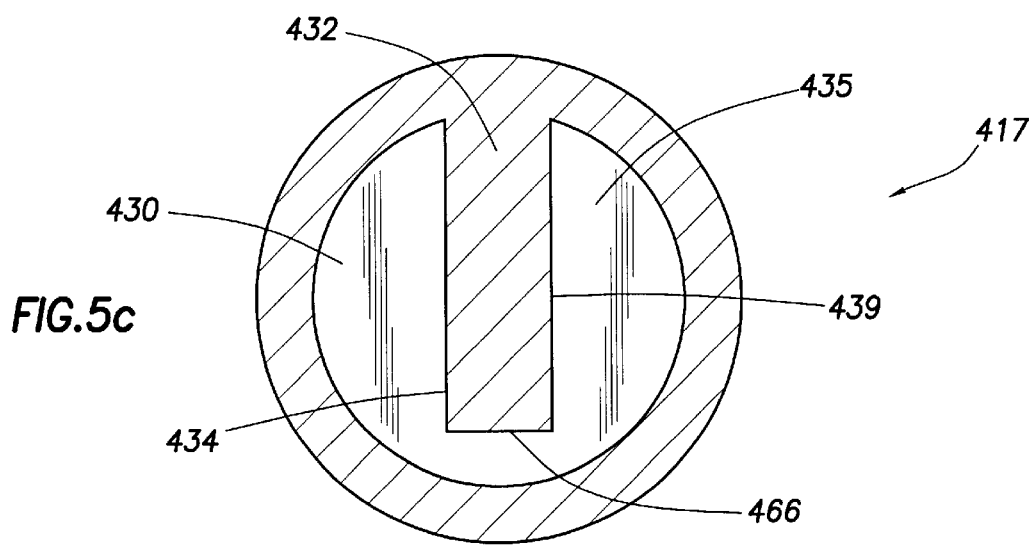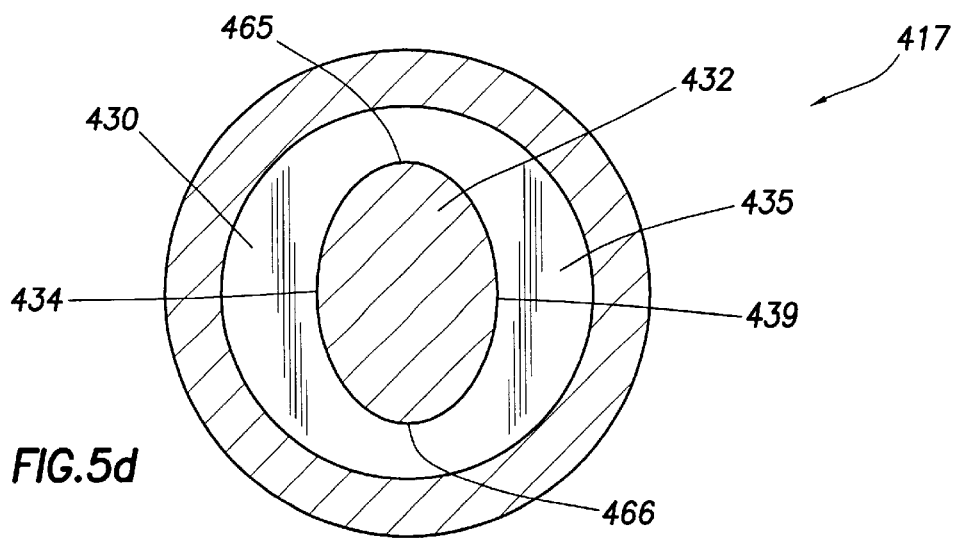

MULTI-ZONE COMBUSTION CHAMBER FOR COMBUSTION RATE SHAPING AND EMISSIONS CONTROL IN PREMIXED-CHARGE COMBUSTION ENGINES

GOVERNMENT RIGHTS IN THIS INVENTION

This invention was made with U.S. government support under contract number DAAE 07-95-C-R081, PS0013. The U.S. government has certain rights in this invention.

BACKGROUND OF THE INVENTION

1. Field of the Invention

Embodiments of the invention generally relate to an apparatus and method of use in an internal combustion engine. More particularly, embodiments of the invention relate to a combustion chamber design that physically segregates the chamber into multiple smaller chambers during combustion in a combustion engine.

2. Description of the Related Art

Conventional combustion, reciprocating engines are widely used as automotive engines. These engines are designed to work on a predetermined mixture of air and fuel, which is ignited by an ignition plug, such as a spark plug or a glow plug, in a combustion chamber.

FIG. 1 is a cross-sectional view of a conventional power cylinder assembly 50. The power cylinder assembly 50 includes a cylinder 110, a piston 100, a cylinder head 117, valves 140 and 150, an ignition plug 160, and manifolds 145 and 155. A combustion chamber 115 is defined by an inner wall 111 of the cylinder 110, the crown or top surface 107 of the piston 100, along with the cylinder head 117. The piston 100, which is slideably disposed in the cylinder 110, and the inner wall 111 of the cylinder 110 are generally cylindrical in shape. The piston 100 includes several compression seals 120 (commonly referred to as piston rings) disposed within annular grooves 122 on an outer surface 124 of the piston 100 to keep the fuel/air mixture (hereinafter "mixture") within combustion chamber 115. Additionally, the piston 100 includes an aperture 105 for connecting the piston to a connecting rod (not shown), whereby the piston may be moved in a reciprocating fashion (e.g., axially within the cylinder 110). The movement of the piston 100 is translated to the rod, which provides power to an engine crank shaft (not shown). The intake manifold 145 delivers the mixture to the combustion chamber 115 and the intake valve 140 regulates the amount of mixture that enters the chamber. The ignition plug 160 ignites the mixture in the combustion chamber 115 and produces a combustion flame. The exhaust valve 150 and the exhaust manifold 155 exhaust the burned mixture and any remaining mixture from the chamber 115.

Typically, an engine cycle starts with an intake stroke, wherein the mixture is delivered into the combustion chamber 115. During the intake stroke, the piston 100 descends to bottom dead center or the lowest point that the piston may travel in the cylinder 110. At this point, the intake valve 140 opens and supplies the combustion chamber 115 with the appropriate amount of mixture through the intake manifold 145. During the intake stroke, the exhaust valve 150 remains closed. As the mixture enters the combustion chamber 115, a swirl, which mixes the air and fuel, is created by the positioning of the intake valve 140 at a certain angle in the cylinder head 117. Further, the swirl may be utilized to create turbulence for combustion enhancement. After the piston 100 reaches bottom dead center, the intake valve 140 is closed and ends the intake stroke. The compression stroke begins when the piston 100 ascends in the cylinder 110. The compression stroke compresses the mixture for better combustion. In the compression stroke, the piston 100 ascends in the cylinder 110 and causes the mixture to squish or move radially inward, causing a squish flow. The squish flow helps to promote faster combustion by enhancing flame propagation. Before the piston 100 reaches top dead center, or the highest point that the piston can travel in the cylinder, an ignition plug 160 is fired to ignite the mixture. In diesel engines, no ignition plug is present, but instead, ignition can occur when the compression pressure and temperature in the chamber is sufficient to support ignition. The pressure and temperature in the combustion chamber 115 are increased by the burning mixture and the pressure forces the piston 100 to descend during the expansion stroke, which moves the connecting rod to power the engine. The expansion stroke provides power to the engine. The piston 100 reaches bottom dead center and ends the expansion stroke. The exhaust stroke, which removes the combusted mixture from the chamber 115, begins when the piston 100 ascends in the cylinder 110. As the piston 100 ascends, the exhaust valve 150 opens to remove the combustion by-products and any remaining mixture through the exhaust manifold 155. The cycle is then repeated.

The efficiency of the combustion chamber to combust the mixture determines the amount of pollutants such as oxides of nitrogen or $NO_x$ that are released into the atmosphere. To achieve higher efficiency using hydrocarbon fuels, leaner fuel to air ratios have been utilized. For equivalent power output, a leaner fuel to air ratio must be accompanied by a higher over-all airflow to the engine. The leaner fuel to air ratio leads to high thermal efficiencies, when the airflow has been compensated, and to higher peak temperatures. At higher peak temperatures, combustion efficiency improves at the expense of increased production of $NO_x$. It is known that above 1300–1500° K. (Kelvin), $NO_x$ production increases greatly; hence it is desirable to control the peak temperature below this range. Additionally, faster flame propagation speed increases engine thermal efficiency, but can cause knock (commonly referred to as auto ignition). Knock occurs when the chemical kinetic reactions within the unburned mixture spontaneously ignite during the engine cycle. Typically, knock is initiated by compression of the unburned mixture during the combustion portion of the engine cycle. After the spark ignition process, the unburned mixture is subjected to compression by the combined effects of piston's motion and flame propagation. If the flame produced by the ignition plug fails to consume the entire unburned mixture before compression-induced chemical reactions cause spontaneous ignition within the unburned mixture, knock will occur. Hence, control of the propagation of the flame has a direct impact on the propensity for a given engine to knock. Knock decreases combustion efficiency because the energy created during auto ignition is uncontrolled and can lead to catastrophic engine failure.

In a conventional combustion chamber, the squish region, where squish flow is created, may be up to 70% of the crown's surface and is a continuous region. Because the squish region is one, large continuous area, there is more area for a flame to lose energy into the piston and quench due to wall heat transfer losses. Additionally, the flame tends to extinguish by the time it reaches the outer portion of the squish region, thereby leaving some mixture unburned leading to combustion inefficiency.

In engines, a brake mean effective pressure (BMEP) is generated within the combustion chamber as a resultant pressure force produced from the controlled burning of the mixture. High BMEP is associated with high power output and high engine efficiency. In conventional high BMEP applications, the ignition plug is fired at a relatively high pressure and temperature. However, firing at higher pressure decreases the life of the ignition plug. In order for the ignition plug to last longer, it should be fired at a lower pressure than the pressure required in conventional engine designs used in high BMEP applications. However, if the ignition plug is fired at a lower pressure or earlier ignition timing (advanced ignition timing), the productions of knock and $NO_x$ emissions increase.

Various attempts have been made to improve combustion chambers for use with lean mixtures to reduce concentrations of $NO_x$ and knock. U.S. Pat. No. 5,224,449 discloses using a toroidal chamber on the crown of the piston, whereby a mixture is ignited in the main chamber then reaches the toroidal chamber and ignites the fuel in the toroidal chamber. The pressure in the toroidal chamber increases, whereby a combustion jet gas is shot into the main chamber causing a turbulence that mixes and combusts the mixture. However, the temperatures and pressures produced in the toroidal chamber are so great, that damage to the toroidal chamber of the piston, may occur, leading to catastrophic engine failure. Additionally, the high flame temperature can't be controlled leading to increased $NO_x$ production. U.S. Pat. No. 4,920,937 includes a combustion chamber having a squish region for generating a squish flow. The squish flow helps to propagate flame speed from the spark plug to the main chamber for better combustion efficiency. However, the increased flame speed can increase undesired knock and decrease engine efficiency. Additionally, because the squish area of the squish region is relatively large, the flame can extinguish before reaching the mixture remaining in the squish region, leading to increased uncombusted or unburned hydrocarbons.

Therefore, there is a need for a combustion chamber that can efficiently combust a fuel/air mixture, while reducing the production of air pollutants.

SUMMARY OF THE INVENTION

Embodiments of the present invention generally provide for an improved method and combustion chamber for use in a combustion engine that is segregated into multiple chambers to control peak pressure and temperature and to control flame propagation speed to reduce knock.

In one embodiment, a combustion apparatus having a combustion chamber is provided. The combustion chamber preferably includes a cylinder having an inner wall and a cylinder head, and a piston disposed in the cylinder. The piston preferably has a top surface having at least a first and a second chamber being concentric about a central axis of the piston. The first and second chambers can be annular recessed grooves, circular recesses or a combination thereof. An inner annular portion is formed between the at least first and the at least second chambers. Additionally, an outer raised portion is formed between the at least second chamber and a perimeter of the piston. The combustion apparatus further includes an intake valve and an intake manifold disposed in the cylinder head and in communication with the combustion chamber. Further, an exhaust valve and exhaust manifold are disposed in the cylinder head and in communication with the combustion chamber. Additionally, an ignition device is disposed in the cylinder head and extends into the combustion chamber.

In another embodiment, a piston for an internal combustion engine is provided and preferably includes a cylindrical body that has a surface that defines a region of a combustion chamber, wherein the surface includes at least one circular recessed portion and at least one annular recessed groove being concentric about a central axis of the cylindrical body. The at least one circular recessed portion may be separated from the at least one annular recessed groove by an inner annular raised portion. Additionally, the at least one annular recessed groove is separated from a perimeter of the surface by an outer annular raised portion.

In still another embodiment, the piston includes a surface that defines a portion of the combustion chamber. The surface includes a chamber that has a partition dividing the chamber into approximately equal sized first and second chambers. The partition can act as flame control portion that directs the flame from one chamber into another and controls the flame propagation speed.

In a further embodiment, a combustion apparatus is provided having a cylinder head that includes a surface that defines a combustion chamber. The surface can include at least one circular recess and at least one annular recessed groove being concentric about the central axis of the cylinder head. The at least one circular recess may be separated from the at least one annular recessed groove by an inner annular raised portion. Additionally, the at least one annular recessed groove is separated from a perimeter of the surface by an outer annular raised portion.

In still a further embodiment, an apparatus for use in a combustion engine is provided that includes a cylinder head having a surface defining a portion of a combustion chamber, the surface having a chamber formed therein. A partition divides the chamber into approximately equal sized first and second chambers. The partition can act as a flame control portion that directs the flame from one chamber into another and controls the flame propagation speed.

A method for efficiently combusting a mixture of fuel and air in a combustion chamber is also provided and can include the steps of admitting a mixture of fuel and air into the combustion chamber having a surface that includes at least a first chamber concentric with a central axis of the surface and at least a second chamber concentric with the central axis; and controlling a peak temperature and pressure of the combustion chamber by first igniting the mixture in the at least first chamber and producing a combustion flame, then igniting the mixture in the at least second chamber by the combustion flame thereby, producing the peak temperature and pressure in the combustion chamber. The method can also include controlling the flame propagation speed to reduce knocks and pollutants, with the inner and outer annular raised portions and their walls, and can further include controlling turbulence within the combustion chamber by providing separate squish portions designed to optimize turbulence in each of the separate combustion chambers. The method can also include controlling the peak temperature and pressure to decrease the production of pollutants by maintaining the temperature less than about 1,300° K. to 1,500° K. and/or by establishing a size and shape of the at least first and second chambers. By controlling the peak temperature and pressure, the life the ignition plug can increase by firing it at lower peak pressure.

BRIEF DESCRIPTION OF THE DRAWINGS

So that the manner in which the above recited embodiments of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 5a–d shows various embodiments of the configuration of the cylinder head along line 5a—5a of FIG. 4.

DETAILED DESCRIPTION OF THE PREFERRED EMBODIMENT

Figure 1:
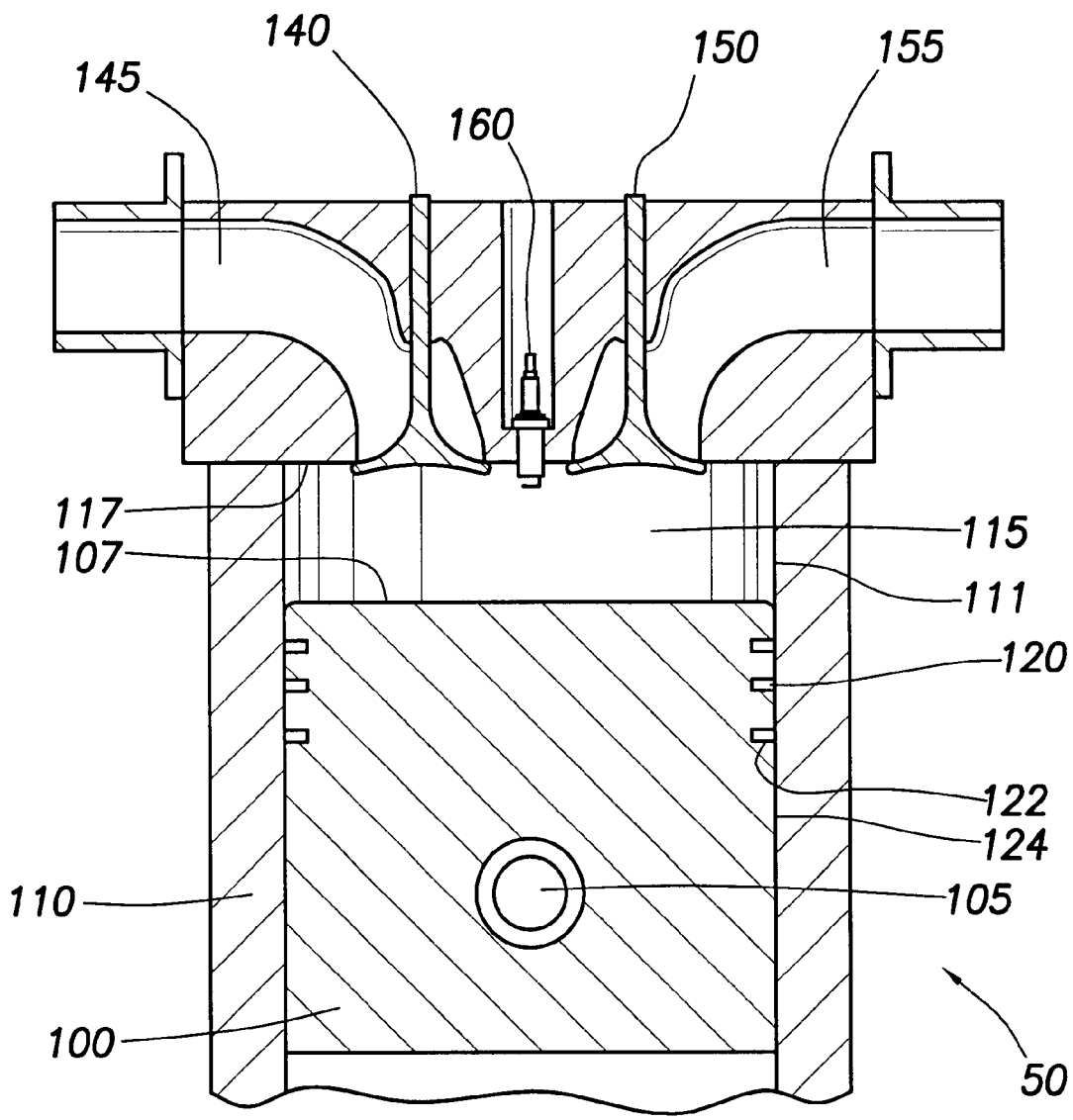
FIG. 1 is a cross-sectional view of a conventional power cylinder assembly.
Figure 2:
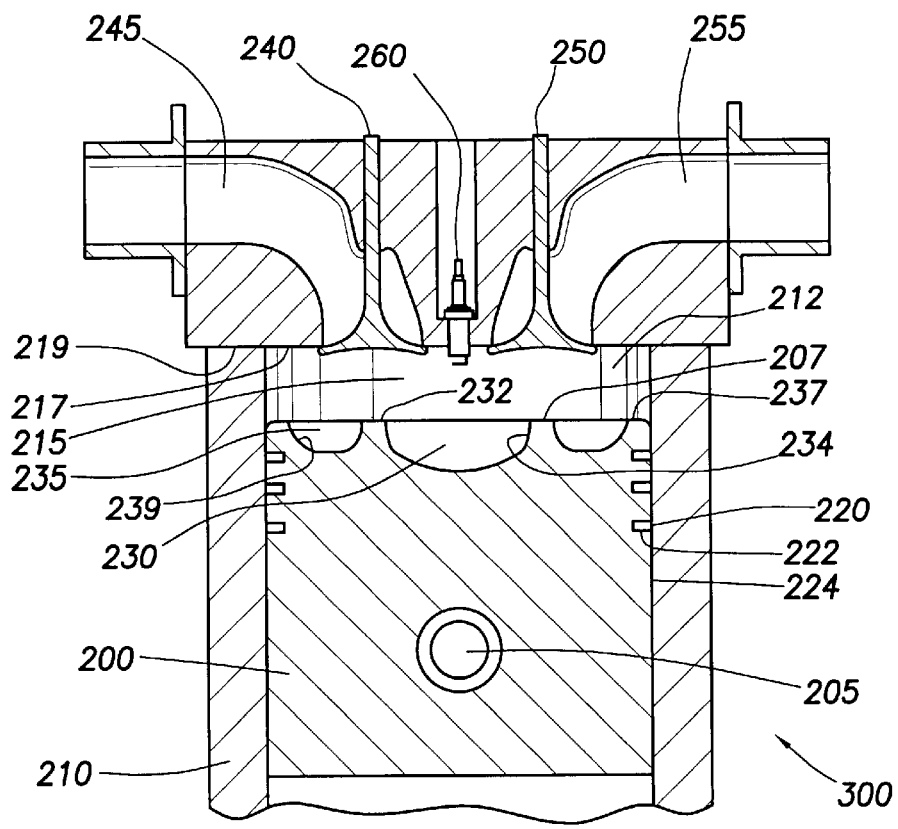
FIG. 2 is a cross-sectional view of one embodiment of a power cylinder assembly.

FIG. 2 is a cross-sectional view of one embodiment of a power cylinder assembly 300. The power cylinder assembly 300 preferably includes a piston 200 preferably slidably disposed in a cylinder 210, and a cylinder head 217 disposed above the piston 200. A combustion chamber 215 defined by a crown 207 of the piston 200, the inner wall 212 of cylinder 210, and the cylinder head 217. The cylinder head 217 includes a cylinder base 219, an intake manifold 245 and an intake valve 240 that are in communication with the combustion chamber 215. Additionally, the cylinder head 217 includes an exhaust manifold 255 and an exhaust valve 250 that are in communication with the chamber 215, and an ignition plug 260 disposed above the combustion chamber 215. The intake valve 240 (shown in the closed position) controls the amount of mixture that is delivered into the combustion chamber 215 from the intake manifold 245. The mixture can be ignited by the ignition plug 260 in the cylinder head 217. After the mixture is ignited, the remaining unburned mixture and exhaust from the combustion chamber 215 are released to the exhaust manifold 255 through the exhaust valve 250 (shown in the closed position). The intake valve 240 and exhaust valve 250 may be ports in smaller engines. Furthermore, some engines may comprise multiple intake and exhaust valves.

The piston 200 includes annular grooves 222 that houses one or more compression seals 220 (or piston rings) around an outer surface 224 to keep the mixture within the combustion chamber 215. Additionally, the piston 200 may include an aperture 205 for connecting the piston to a connecting rod (not shown), whereby the piston is moved in reciprocating fashion and transfers the power that is generated to the rod, which in turn transfers power to an engine crank shaft (not shown).

In one embodiment of FIG. 2, the piston 200 preferably includes the crown 207 having a main chamber 230 formed in the center thereof. The main chamber 230 can be constructed and arranged to hold a defined volume of mixture therein. The main chamber 230 is preferably a circular recess having a wall 234. A secondary chamber 235, preferably an annular recessed groove having a wall 239, formed outwardly of the main chamber 230 and coaxial therewith. The main chamber 230 and secondary chamber 235 may be concentric about a central axis of the piston 200. The secondary chamber 235 may also be constructed and arranged to hold a defined volume of mixture therein. The main and secondary chambers mean a cavity, recess, groove or the like that is capable of receiving or holding the mixture. Additionally, the main chamber can be the chamber that may be ignited by the ignition plug, while the secondary chamber can be another chamber or chambers that a combustion flame will travel to after being ignited in the main chamber. The main chamber 230 and the secondary chamber 235 can temporarily segregate the combustion chamber 215 into two chambers when the piston 200 reaches top dead center.

The secondary chamber 235 may be separated from the main chamber 230 by an inner annular raised portion 232. An outer annular raised portion 237 can be formed between the outside wall of the secondary chamber 235 and a perimeter of the crown 207 of the piston 200. The inner annular raised portion 232 and the outer annular raised portion 237 are also known as squish regions. By providing smaller squish regions 232, 237, less energy is lost to the piston 200, thus allowing for a decreased flame speed without total flame quench. Because the inner and outer annular raised portions 232, 237 decrease the flame speed, they are also flame control portions.

In operation, the intake and exhaust valves 240, 250 are initially closed. The piston 200 descends to bottom dead center of the cylinder 210 during the intake stroke. The intake valve 240 opens during the intake stroke, thereby allowing the lean mixture to enter from the intake manifold 245 into the combustion chamber 215. The mixture enters the main chamber 230 and the secondary chamber 235. After the piston 200 reaches bottom dead center, it ascends during the compression stroke and the intake valve 240 is closed. As the piston 200 reaches top dead center, the mixture is pressurized and the plug 260 ignites the mixture in the main chamber 230. Because the predetermined volume of the mixture that is trapped by the main chamber 230 is smaller than conventional combustion chambers, the peak combustion pressure and temperature occurring in the main chamber 230 can be limited or controlled to levels at or below a conventional chamber.

When the mixture is ignited, a flame is produced and propagates in the main chamber 230 where a peak temperature and pressure are produced. However, the peak temperature and pressure are controlled by the limited volume of mixture available to burn at this point. In addition to controlling the peak temperature and pressure through the volume of the chamber 230, the flame propagation speed can be controlled by the slope or contour of the wall 234 of the main chamber 230 and by the inner annular raised portion 232. As noted above, at fast flame propagation speed, the flame compresses the mixture in front of it, thereby increasing the temperature and pressure to cause knock. Here, the flame can travel radially from the main chamber 230, up the wall 234, across the inner annular raised portion 232, in order to combust the mixture in the secondary chamber 235. The inner annular raised portion 232 is constructed and arranged to slow down the flame (but not quench), because the flame must travel through the predetermined quenching distance or the length of the portion 232, to reach the secondary chamber 235. By controlling the flame propagation speed, the propensity for knock is reduced, leading to more efficient combustion of the mixture. As noted above, at combustion temperature above 1300–1500° K., there is a noted increase in the $NO_x$ production. By controlling the peak temperature so that it does not stay above or reach 1300–1500° K., the production of undesired $NO_x$ is reduced. Additionally, the amount of energy lost to heat transfer into the piston can be limited by the area provided for the annular raised portions 232, 237. Further, because the inner annular raised portion 232 produces a temporary near-quench region only when the piston 200 is near top dead center, subsequent combustion when the piston is on its down stroke allows efficient removal of unburned hydrocarbons in this region of the chamber. The combustion chamber 215 creates efficient removal of unburned hydrocarbons from portion 232, because portion 232 is a significant fraction of the overall squish area (portion 232 plus portion 237), thus, overall emissions of unburned hydrocarbons from the combustion chamber 215 will be lower than those of a conventional combustion chamber.

By controlling the peak pressure and temperature used in high BMEP applications, advanced ignition timing can be utilized, thus, the life of the ignition plug 260 can be extended. High BMEP applications produce relatively high temperature and pressure in the combustion chamber 215. Because the peak temperature and pressure can be controlled through the current chamber designs, the plug 260 can be ignited at a lower pressure (advanced ignition timing) than in conventional combustion chambers. Because the ignition plug 260 can be fired at lower pressure, the plug has a longer life span. The ignition plug 260 described herein can be any ignition plug that is capable of igniting the mixture.

The secondary chamber 235 is ignited as the flames from the primary combustion event travel across the inner annular raised portion 232. The flames will combust the remaining mixture in the secondary chamber 235. By providing the secondary chamber 235 with a predetermined volume of mixture, again, the peak temperature and pressure in the combustion chamber 215 can be controlled. By providing another chamber wall 239 and the outer annular raised portion 237, the flame propagation speed can again be controlled and decrease the potential for knock. The flame propagation speed is slowed because the flame must travel up the wall 239 of the secondary chamber 235 and across the outer annular raised portion 237 to reach the inner wall 212 of the cylinder 210. Again, the quenching area of outer portion 237 is constructed and designed to slow the flame propagation speed, but not quench the flame completely. Additionally, because the quenching region of the outer annular raised portion 237 is smaller (less area for heat loss transfer) than conventional quenching regions, the flames can reach the inner wall 212 of the cylinder 210 to combust any remaining mixture trapped in the outer portion 237. At this time, the piston 200 descends after top dead center during the compression stroke. The cycle continues as described above.

The designs of the chambers 230, 235 can also influence the turbulence produced in the chambers 230, 235 and hence, the flame's propagation speed. The widths of the main chamber 230 and the secondary chamber 235 can be designed to help control the turbulence produced in the chambers. By narrowing the widths of the chambers 230, 235, the turbulence generated within the respective chambers can increase. When the squish produced by the squish regions of the outer and inner annular raised portions 232, 237 enters the respective chambers 230, 235, the turbulence and the flame propagation speed can increase leading to better combustion of the mixture. Although, turbulence leads to better mixing of the mixture, higher combustion efficiency temperature, and better combustion efficiency, it also increases propagation speed of the flames. As shown above, the increased temperature leads to increase $NO_x$ productions, and the increased flame propagation speed leads to increase knock. The main chamber 230 and secondary chamber 235 are designed to increase turbulence to a predetermined point so that flame temperature and propagation speed will be controlled and prevent unnecessary production of $NO_x$ and knock.

Figure 3:
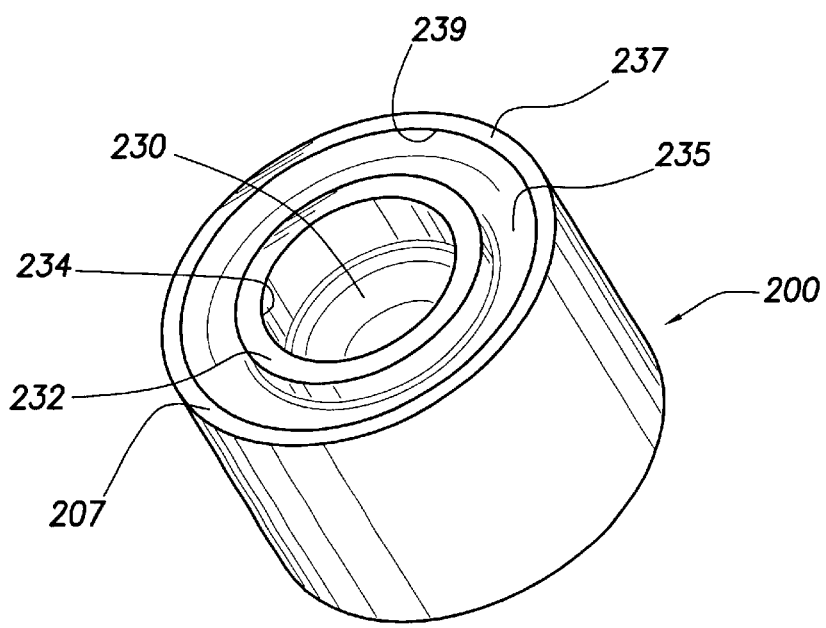
FIG. 3 is a perspective view of one embodiment of the piston.

FIG. 3 is a perspective view of one embodiment of the piston 200. The piston 200 includes a crown 207 having a main chamber 230, preferably a circular recess, that is formed in the center thereof. The main chamber 230 has a wall 234 that defines the chamber. Also shown is a secondary chamber 235, preferably an annular recessed groove, that is formed in the crown 207 of the piston 200. The main chamber 230 and the secondary chamber 235 may be concentric about a central axis of the piston 200. The secondary chamber 235 is separated from the main chamber 230 by an inner annular raised portion 232. An outer annular raised portion 237 separates the outside wall 239 of the secondary chamber 235 and a perimeter of the piston's crown 207.

Figure 4:
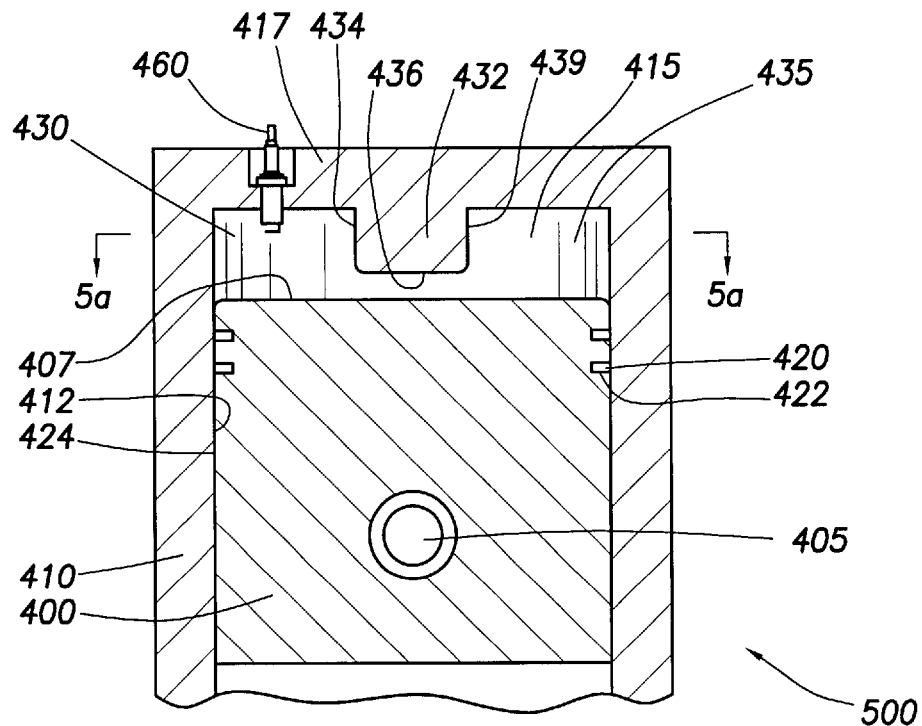
FIG. 4 is a cross-sectional view an alternative power cylinder assembly.

In an alternative embodiment, the cylinder head 417 may have a main chamber 430 and a secondary chamber 435 on a base surface. FIG. 4 is a cross-sectional view an alternative power cylinder assembly 500. The power cylinder assembly 500 comprises a cylinder head 417 having an ignition plug 460 that is disposed over a main chamber 430, and a partition 432 that separates a secondary chamber 435 from the main chamber 430. The power cylinder assembly 500 may further include a piston 400 having a crown 407. The piston 400 may be slidably disposed in the cylinder 410 and may include annular grooves 422 around its outer surface 424. The annular grooves 422 house one or more compression seals 420. Additionally, the piston 400 may include an aperture 405 for connecting the piston to a connecting rod (not shown). In this embodiment, the piston's top surface 440 may not contain any chambers thereon.

Although the cylinder head 417 preferably includes the intake valve, the intake manifold, the exhaust valve, and the exhaust manifold, they are not shown in FIG. 4 for clarity. The cylinder head 417 can include a chamber that is divided into the main chamber 430 and the secondary chamber 435 by the partition 432. Additionally, the combustion chamber 415 can be defined by the crown 407, the inner wall 412 of cylinder 410, the cylinder head 417 that includes chambers 430, 435 and the partition 432. The partition 432 may be generally rectangular, but may be any shape or size and may include (depending on the design) wall 434 on a first surface, wall 436 on a second surface, wall 439 on a third surface, wall 465 on a fourth surface, and wall 466 on a fifth surface (see FIGS. 5a–5d). The partition 432 can be constructed and arranged to function as a flame control portion or quenching portion, and directs the flame when it travels from one chamber to another. By providing the partition 432 and directing the flame along the partition, heat loss to the walls of the cylinder head 417 and the partition can occur, thereby slowing the flame propagation speed.

Figure 5A:
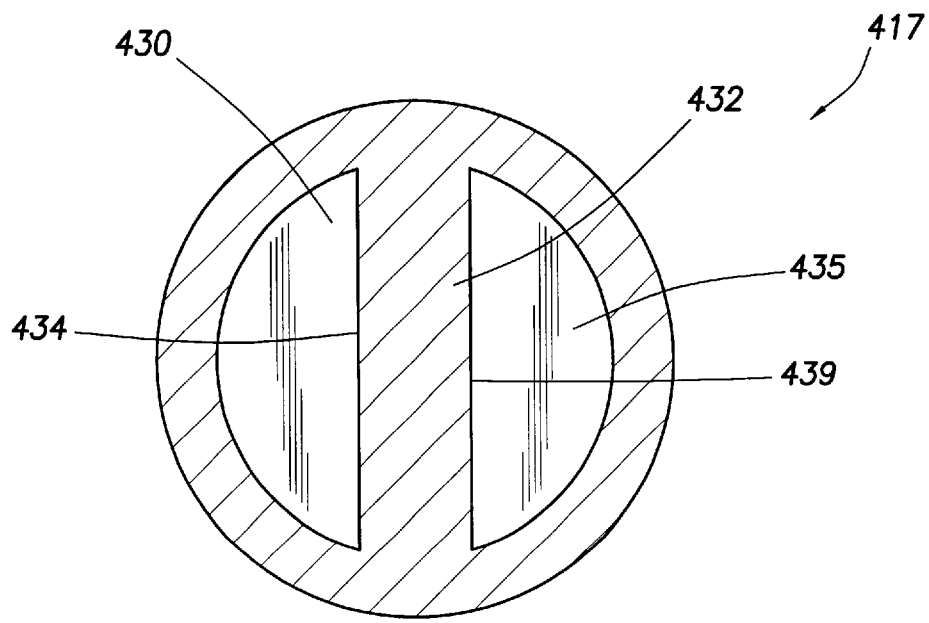

FIGS. 5a–d show various embodiments of the configuration of the cylinder head 417 along line 5a—5a of FIG. 4. In FIG. 5a, the partition 432 preferably divides a chamber into the first and second and the second chamber 430, 435, which generally can be half-moon shaped chambers of approximately equal size. The partition 432 may be constructed and arranged to direct the flames to travel along wall 436 (see FIG. 4) of the partition in order to travel from one chamber to another.

FIG. 5b shows another embodiment of a configuration of the cylinder head 417. In this embodiment, the partition 432 is disposed in a chamber in the cylinder head 417 and divides the chamber into approximately two equal chambers, namely, a main chamber 430 and a secondary chamber 435. Additionally, the partition 432 may be constructed and arranged so that the flames can travel along walls 465 and/or 466, and preferably not wall 436 (FIG. 5a) in order to travel from one chamber to another.

FIG. 5c shows another embodiment of a configuration of the cylinder head 417. In this embodiment, the partition 432 extends at least partially into a chamber, thereby dividing it generally into a main chamber 430 and a secondary chamber 435. Additionally, the partition 432 may be constructed and arranged so that the flame can travel along wall 466, and preferably not walls 436 and 465 in order to travel from one chamber to another.

FIG. 5d shows another embodiment of a configuration of the cylinder head 417. In this embodiment, partition 432 is generally elliptical in shape, and divides a chamber in the cylinder head 417 generally into a main chamber 430 and a secondary chamber 435. Additionally, the partition 432 may be constructed and arranged so that the flames can travel along walls 465 and 466 and preferably not wall 436 (See FIG. 4) in order to travel from one chamber to another.

In operation, a mixture is provided to combustion chamber 415 through the intake valve (not shown). The mixture may be separated into the main chamber 430 and the secondary chamber 435 when the piston 400 is at top dead center. The plug 460 ignites the mixture in main chamber 430 which produces combustion flames. Because the main chamber 430 has a defined volume of mixture than can burn at this point, the combustion pressure and temperature can be controlled and leads to low production of $NO_x$. Additionally, in one embodiment, the flame propagation speed can be controlled by the slope or contour of wall 434 and the partition 432. The flames can travel across the wall 434 of the main chamber 430, across the wall 436 of partition 432 in order to combust the mixture in the secondary chamber 435. In another embodiment, the flames can travel from main chamber 430 to secondary chamber 435 by crossing wall 465 and/or wall 466 of the partition 432. In still another embodiment, the flame can travel from main the chamber 430 to the secondary chamber 435 by crossing the wall 466 of partition 432. Regardless of which walls of the partition 432 that the flames travel across, each of the walls, including the wall of the cylinder head 217, act as a quenching region in order to slow the flame propagation speed, reduce the potential for knock, and lead to more efficient combustion of the mixture. After the flames cross the partition 432, it can ignite the mixture in secondary chamber 435. Because the secondary chamber 435 also has a defined volume of mixture that can burn at this point, the combustion pressure and temperature can be controlled leading to low production of $NO_x$.

Figure 7:
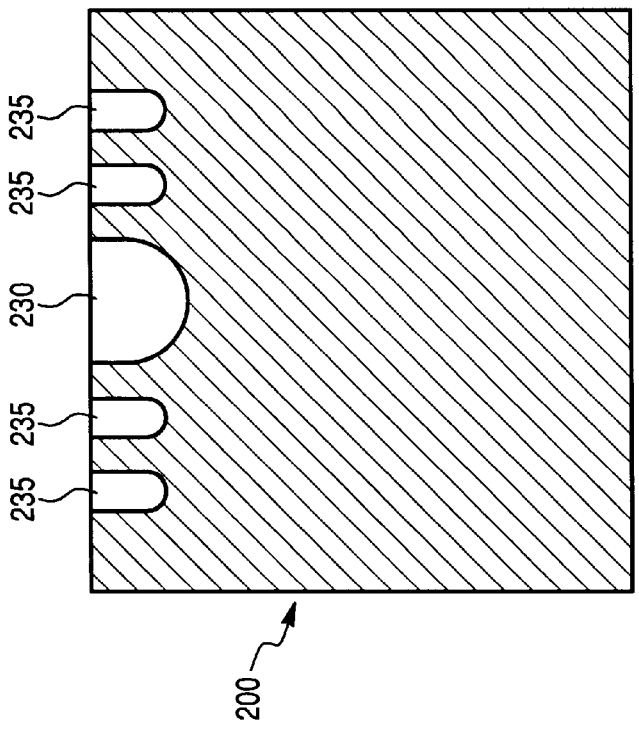
FIG. 7 is a cross-sectional view along line 7—7 of FIG. 6.
Figure 6:
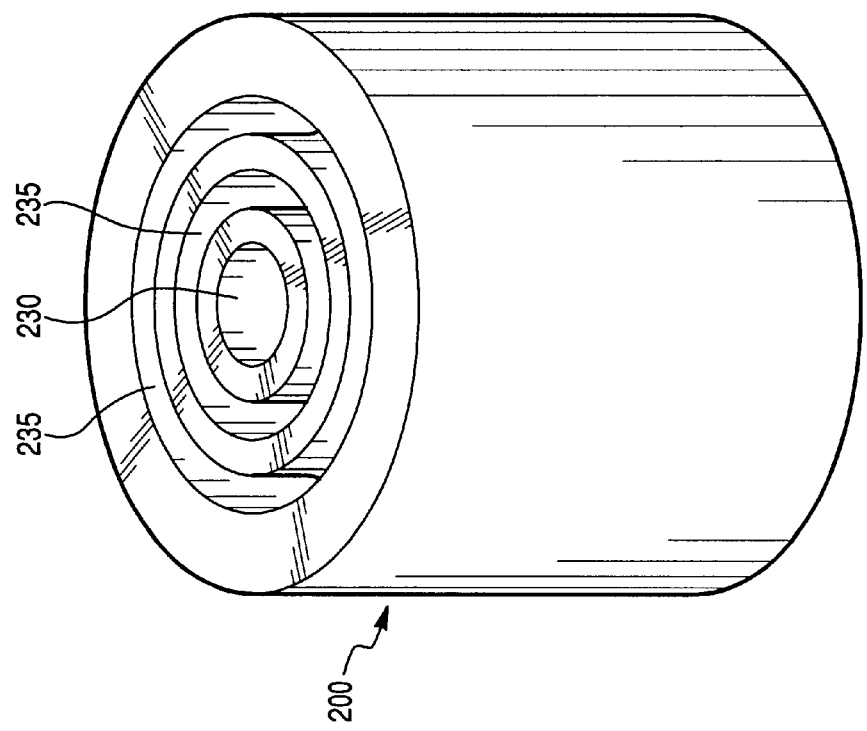
FIG. 6 is an perspective view of an embodiment of a piston of the present invention.

The embodiments of the invention provide a controlled combustion process by a cascaded combustion event within each segregated chamber. Although the main chamber is preferably a circular recess and the secondary chamber is preferably an annular recessed groove as described above, in other embodiments, the main chamber may be an annular recessed groove and the secondary chamber may be a circular recess. Additionally, one skilled in the art will also recognize that the chambers may include only circular recesses or only annular recessed grooves or any combinations thereof, as shown in FIGS. 6 and 7. Although only two chambers are mainly discussed herein, the invention may be used with multiple chambers of varying sizes, shapes, volumes, having a lower portion being concave and other characteristics. Also, the embodiments discussed above may be used on either the crown of the piston or on the cylinder head or a combination thereof. The chambers may be constructed to have varying widths to control turbulence therethrough. Also, the length and area of the squish/quenching regions may be adjusted to control the flame propagation speed. Additionally, the invention may be used with any combustion engine including two and four stroke engines.

While the foregoing is directed to embodiments of the present invention, other and further embodiments of the invention may be devised without departing from the basic scope thereof, and the scope thereof is determined by the claims that follow.

What is claimed is:

1. A combustion apparatus comprising:
   a combustion chamber comprising:
      a cylinder having an inner wall and a cylinder head; and
      a piston disposed in the cylinder, the piston having a top surface that includes at least a first chamber being concentric about a central axis of the piston and at least a second chamber being concentric about the central axis, wherein the at least first and second chambers have a concave bottom portion and a cross section of the at least a second chamber is more narrow in width than the at least a first chamber.

2. The combustion apparatus of claim 1, wherein the at least first chamber is selected from a group consisting of an annular recessed groove, a circular recess, and a combination thereof.

3. The combustion apparatus of claim 1, wherein the at least second chamber is selected from a group consisting of an annular recessed groove, a circular recess, and a combination thereof.

4. The combustion apparatus of claim 1, wherein the piston further comprises an inner annular raised portion that is formed between the at least first chamber and the at least second chamber.

5. The combustion apparatus of claim 1, wherein the piston further comprises an outer annular raised portion that is formed between the at least second chamber and a perimeter of the top surface.

6. The combustion apparatus of claim 1, further comprising:
   an intake manifold and intake valve that is disposed in the cylinder head and in communication with the combustion chamber;
   an exhaust manifold and exhaust valve that is disposed in the cylinder head and in communication with the combustion chamber; and
   an ignition device that is disposed in the cylinder head and extending into the combustion chamber.

7. The combustion apparatus of claim 6, wherein the ignition device is a spark plug disposed above the at least first chamber.

8. A piston for a combustion engine, comprising:
   a cylindrical body having a combustion surface defining a portion of a combustion chamber, wherein the combustion surface comprises at least one circular recess being concentric about a central axis of the cylindrical body and at least one annular recessed groove being concentric about the central axis, wherein the at least one circular recess and the at least one annular recessed groove have a concave bottom portion and the at least one annular recessed groove is more narrow in width than the at least one circular recess.

9. The piston of claim 8, wherein the circular recess is separated from the at least one annular recessed groove by an inner annular raised portion.

10. The piston of claim 9, wherein the at least one annular recessed groove is separated from a perimeter of the combustion surface by an outer annular raised portion.

11. The piston of claim 10, wherein the outer and inner annular raised portions are flame control portions.

12. A piston for a combustion engine, comprising:
a cylindrical body having a combustion surface defining a portion of a combustion chamber, the combustion surface having a chamber therein; and
a partition that divides the chamber into approximately a first and a second chamber, wherein the first and second chambers have a concave bottom portion, wherein the partition is a flame control portion.

13. The piston of claim 12, wherein a flame produced in the first chamber is directed to the second chamber by the flame control portion.

14. The piston of claim 13, wherein the flame has a propagation speed that is controlled by the flame control portion.

15. A piston for a combustion engine, comprising:
a cylindrical body having a combustion surface defining a portion of a combustion chamber, the combustion surface having a chamber therein; and
a partition extending at least partially into the chamber and divides the chamber into approximately a first and a second chamber wherein said partition comprises a top surface, two side surfaces and one distal end.

16. The piston of claim 15, wherein the partition is a flame control portion.

17. The piston of claim 16, wherein a flame produced in the first chamber is directed to the second chamber by the flame control portion.

18. The piston of claim 17, wherein the flame has a propagation speed that is controlled by the flame control portion.

19. An apparatus for use in a combustion engine comprising:
a cylinder having an inner wall and a cylinder head, a piston slideably disposed within the cylinder together defining a combustion chamber, and the piston having a top surface having a plurality of annular recessed grooves that have a concave bottom portion;
means for providing a mixture of fuel and air into the combustion chamber; and
means for igniting the mixture.

20. A combustion apparatus for use in a combustion engine, comprising:
a cylinder head having a combustion surface defining a portion of a combustion chamber, wherein the combustion surface comprises at least one circular recess being concentric about a central axis of the cylinder head and at least one annular recessed groove being concentric about the central axis; and
a piston having a generally planar flat upper surface that defines another portion of the combustion chamber, wherein the at least one circular recess is separated from the at least one annular recessed groove by an inner annular raised portion and the at least one annular recessed groove is separated from a perimeter of the combustion surface by an outer annular raised portion, and
wherein the outer and inner annular raised portions are flame control portions.

21. A combustion apparatus for use in a combustion engine, comprising:
a cylinder head having a combustion surface defining a portion of a combustion chamber, the combustion surface having a chamber therein; and a partition extends at least partially into the chamber and divides the chamber into approximately a first and second chambers, wherein said partition comprises a top surface, two side surfaces and one distal end.

22. The combustion apparatus of claim 21, wherein the partition is a flame control portion.

23. The combustion apparatus of claim 22, wherein a flame produced in the first chamber is directed to the second chamber by the flame control portion.

24. The combustion apparatus of claim 23, wherein the flame has a propagation speed that is controlled by the flame control portion.

25. A method for efficiently combusting a mixture of fuel and air in a combustion chamber, comprising the steps of:
admitting a mixture of fuel and air into the combustion chamber having a surface that includes at least a first chamber concentric with a central axis of the surface and at least a second chamber concentric with the central axis; and
controlling a peak temperature and pressure of the combustion chamber by first igniting the mixture in the at least first chamber and producing a combustion flame, then igniting the mixture in the at least second chamber by the combustion flame thereby, producing the peak temperature and pressure in the combustion chamber.

26. The method of claim 25, further comprises controlling a propagation speed of the combustion flame.

27. The method of claim 25, whereby controlling the peak temperature and pressure comprises establishing a size and shape of the at least first chamber and the at least second chamber.

28. The method of claim 26, wherein controlling the propagation speed of the combustion flame in order to reduce knock and production of pollutants.

29. The method of claim 26, wherein controlling the propagation speed of the combustion flame is accomplished by a wall of the at least first chamber and a wall of the at least second chamber.

30. The method of claim 26, wherein controlling the propagation speed of the flame is accomplished by an inner annular raised portion that separates the at least first chamber and the at least second chamber, and an outer annular raised portion that separates the at least second chamber from a perimeter of the surface.

31. The method of claim 26, wherein controlling the propagation speed of the flame includes controlling turbulence within the combustion chamber by providing separate squish regions designed to optimize turbulence in the at least first chamber and the at least second chamber.

32. The method of claim 25, including controlling the peak temperature and pressure in order to decrease the production of pollutants.

33. The method of claim 25, including controlling the peak temperature and pressure includes maintaining the peak temperature less than about 1,300° K. to 1,500° K.

34. The method of claim 25, wherein controlling the peak temperature and pressure further includes increasing the life of the ignition plug by firing the plug at lower peak pressure.

35. The method of claim 25, wherein the at least first and the at least second chambers are selected from a group consisting of an annular recessed groove, a circular recess, and a combination thereof.

36. A combustion apparatus comprising:
a combustion chamber comprising:
   a cylinder having an inner wall and a cylinder head;
   a piston disposed in the cylinder, the piston having a top surface that includes at least a first chamber being concentric about a central axis of the piston and at least a second chamber being concentric about the central axis;
   an intake manifold and intake valve that is disposed in the cylinder head and in communication with the combustion chamber;
   an exhaust manifold and exhaust valve that is disposed in the cylinder head and in communication with the combustion chamber; and
   an ignition device that is disposed in the cylinder head and extending into the combustion chamber, wherein a cross section of the at least a second chamber is more narrow in width than the least a first chamber.

37. A combustion apparatus comprising:
a combustion chamber comprising:
   a cylinder having an inner wall and a cylinder head;
   a piston disposed in the cylinder, the piston having a top surface that includes at least a first chamber being concentric about a central axis of the piston and at least a second chamber being concentric about the central axis;
   an intake manifold and intake valve that is disposed in the cylinder head and in communication with the combustion chamber;
   an exhaust manifold and exhaust valve that is disposed in the cylinder head and in communication with the combustion chamber; and
   an ignition device that is disposed in the cylinder head and extending into the combustion chamber, wherein the ignition device is a spark plug disposed above the at least first chamber, wherein a cross section of the at least a second chamber is more narrow in width than the at least a first chamber.

38. A piston for a combustion engine, comprising:
   a cylindrical body having a combustion surface defining a portion of a combustion chamber, the combustion surface having a chamber therein; and
   a partition that divides the chamber into approximately equal sized first and second chambers, wherein the partition is a flame control portion.

39. The piston of claim 38, wherein a flame produced in the first chamber is directed to the second chamber by the flame control portion.

40. The piston of claim 39, wherein the flame has a propagation speed that is controlled by the flame control portion.

41. A combustion apparatus for use in a combustion engine, comprising:
   a cylinder head having a combustion surface defining a portion of a combustion chamber, the combustion surface having a chamber therein; and
   a partition that divides the chamber into approximately equal sized first and second chambers, wherein the partition is constructed and arranged to be a flame control portion,
   wherein the partition has a substantially uniform thickness that is about ¼ to ⅓ of the chamber width.

42. The combustion apparatus of claim 41, wherein the partition has a substantially uniform thickness.

43. The combustion apparatus of claim 41, wherein a flame produced in the first chamber is directed to the second chamber by the flame control portion.

44. The combustion apparatus of claim 43, wherein the flame has a propagation speed that is controlled by the flame control portion.

* * * * *